United States Patent
Ratiner et al.

(10) Patent No.: US 12,500,937 B2
(45) Date of Patent: Dec. 16, 2025

(54) DATA SECURITY SYSTEMS AND METHODS ON CONTROLLED DEVICES

(71) Applicants: Michael Ratiner, Rishon Lezion (IL); Dan Eliav, Zichron Yaakov (IL)

(72) Inventors: Michael Ratiner, Rishon Lezion (IL); Dan Eliav, Zichron Yaakov (IL)

( * ) Notice: Subject to any disclaimer, the term of this patent is extended or adjusted under 35 U.S.C. 154(b) by 329 days.

(21) Appl. No.: 18/246,581

(22) PCT Filed: Sep. 23, 2021

(86) PCT No.: PCT/IL2021/051158
§ 371 (c)(1),
(2) Date: Mar. 24, 2023

(87) PCT Pub. No.: WO2022/064497
PCT Pub. Date: Mar. 31, 2022

(65) Prior Publication Data
US 2023/0379367 A1    Nov. 23, 2023

Related U.S. Application Data

(60) Provisional application No. 63/082,730, filed on Sep. 24, 2020.

(51) Int. Cl.
*H04L 9/40*  (2022.01)
*H04L 9/00*  (2022.01)

(52) U.S. Cl.
CPC ............. *H04L 63/20* (2013.01); *H04L 9/50* (2022.05); *H04L 63/08* (2013.01)

(58) Field of Classification Search
CPC ............ H04L 63/20; H04L 63/08; H04L 9/50
(Continued)

(56) References Cited

U.S. PATENT DOCUMENTS 7,852,299 B2 * 12/2010 Kawasaki .............. G09G 3/006
345/82
9,009,805 B1 * 4/2015 Kirkby ............... H04N 21/4622
709/224

(Continued)

FOREIGN PATENT DOCUMENTS

EP          3386142 A1    10/2018
KR      20200020291 A     2/2020
WO       2020139190 A1    7/2020

OTHER PUBLICATIONS

"Blockchains and Smart Contracts for the Internet of Things." (Retrieved on Aug. 12, 2021). Retrieved from the Internet:<https://people.cs.pitt.edu/~mosse/courses/cs3720/blockchain-iot.pdf> Christidis, K et al. Jun. 3, 2016 (Jun. 3, 2016).

(Continued)

*Primary Examiner* — Dant B Shaifer Harriman
(74) *Attorney, Agent, or Firm* — FisherBroyles, LLP; Roger L. Browdy; James E Mrose

(57) ABSTRACT

A blockchain network architecture of an infrastructure for creating end-to-end security between all public network blockchain nodes includes administrator nodes configured to control corresponding blockchain nodes by reading logs, testing and configuration; blockchain nodes configured to communicate with each other through open, unsecured channels connected to a public network, and at least one blockchain core embedded in blockchain nodes of electronic smart IoT devices that includes a transaction module, module of blockchain specific applications and the secure memory; a dual core switching access control module combined hardware and software components; a controlled switch or connector; an in-device administrator module for configuration update and route of trust for all module of blockchain nodes. Information is transmitted between the (Continued)

dual core switching access control module through the blockchain nodes to the controlled switch or connector.

14 Claims, 19 Drawing Sheets

(58) Field of Classification Search
USPC .............................................................. 726/4
See application file for complete search history.

(56) References Cited

U.S. PATENT DOCUMENTS

| | | | | |
|---|---|---|---|---|
| 2005/0022183 | A1* | 1/2005 | Poisson | H04L 12/4641 |
| | | | | 718/1 |
| 2018/0294967 | A1* | 10/2018 | Roberts | H04L 9/3255 |
| 2019/0036906 | A1* | 1/2019 | Biyani | H04L 63/102 |
| 2019/0373472 | A1* | 12/2019 | Smith | H04W 4/38 |
| 2020/0014531 | A1* | 1/2020 | Falco | H04L 63/0884 |
| 2020/0092091 | A1* | 3/2020 | Muller | G06F 21/602 |
| 2020/0175155 | A1 | 6/2020 | Bhamidipati et al. | |
| 2020/0259658 | A1* | 8/2020 | Libsch | H04L 9/3234 |
| 2021/0160314 | A1* | 5/2021 | Parvataneni | H04L 9/3239 |
| 2022/0200973 | A1* | 6/2022 | Tola | H04L 9/3013 |

OTHER PUBLICATIONS

Enhancement of Security and Handling the Inconspicuousness in IoT Using a Simple Size Extensible (Retrieved on Sep. 12, 2021). Retrieved from the Internet:< https://www.researchgate.net/profile/P-Sanjeevikumar/publication/339004393_Enhancement_of_Security_and_Handling_the_IoT_Inconspicuousness_in_using_a_Simple_Size_Extensible_Blockchain/links/5e8db08692851c2f5288867a/Enhancement-of-Security-and-Handling-the-IoT-Inconspicuousness-in-using-a-Simple-Size-Extensible-Blockchain.pdf> Balaji, B. et al. Apr. 8, 2020 (Apr. 8, 2020).

"Robust Blockchain for IoT Security." In 2019 IEEE Global Communications Conference (GLOBECOM), pp. 1-6. IEEE, 2019. Retrieved on Sep. 12, 2021)/ Retrieved from the Internet:< https://www.researchgate.net/profile/Abderrahim-Benslimane/publication/339556368_Robust_Blockchain_for_IoT_Security/links/5e7f4df592851caef4a5dfce/Robust-Blockchain-for-IoT-Security.pdf> Benouar, S. et al. Dec. 9, 2019 (Dec. 9, 2019).

"Blockchain and iot integration: A systematic survey." Sensors 18, No. 8 (2018): 2575. Retrieved on Sep. 12, 2021)/ Retrieved from the Internet:< https://pdfs.semanticscholar.org/3830/57f972b11b99cbc8c0d3e6c47170e9d95c1c.pdf> Panarello A. et al. Aug. 6, 2018 (Aug. 6, 2018).

* cited by examiner

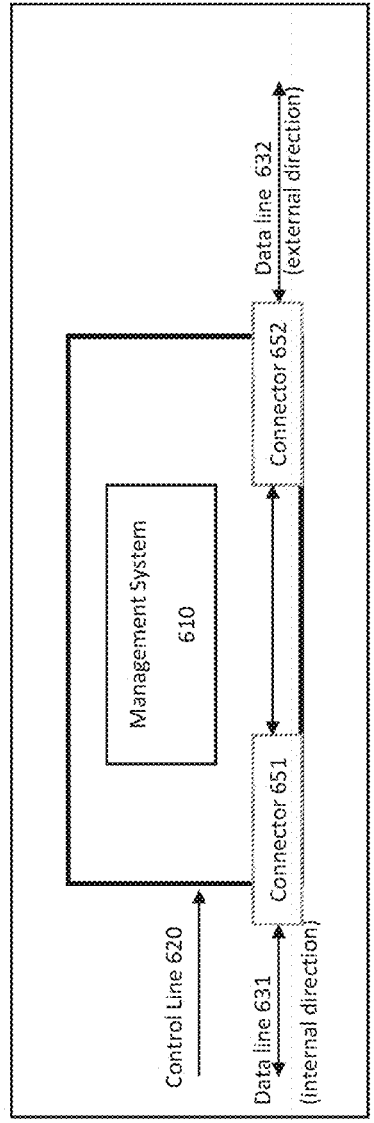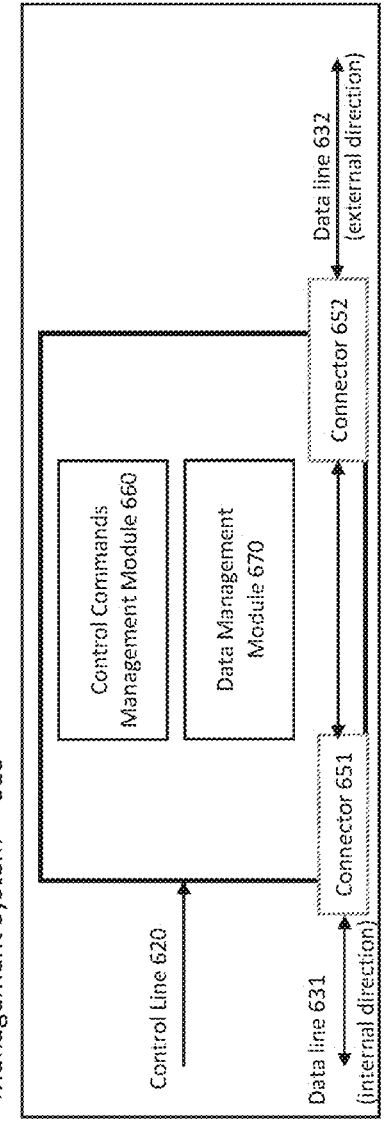

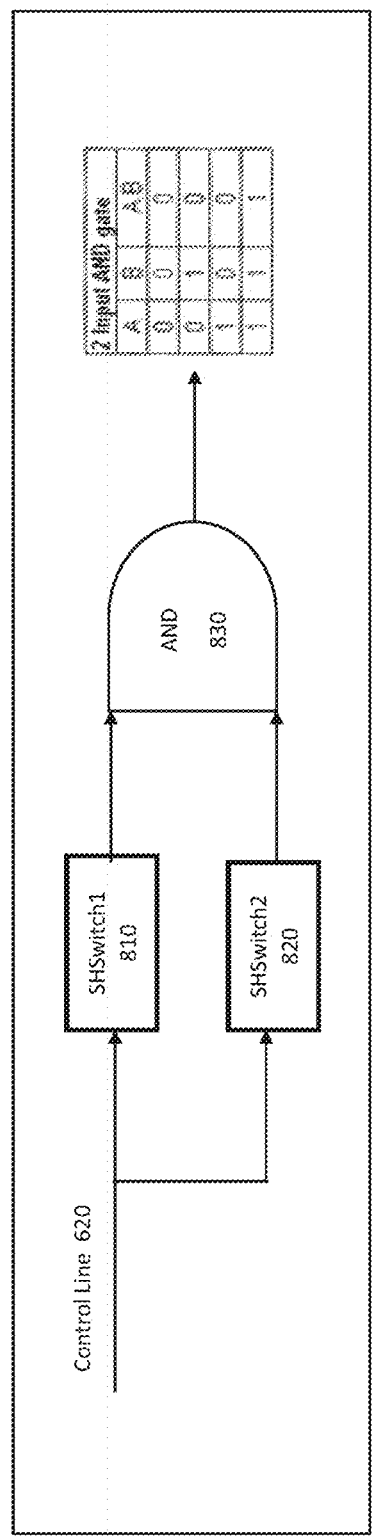
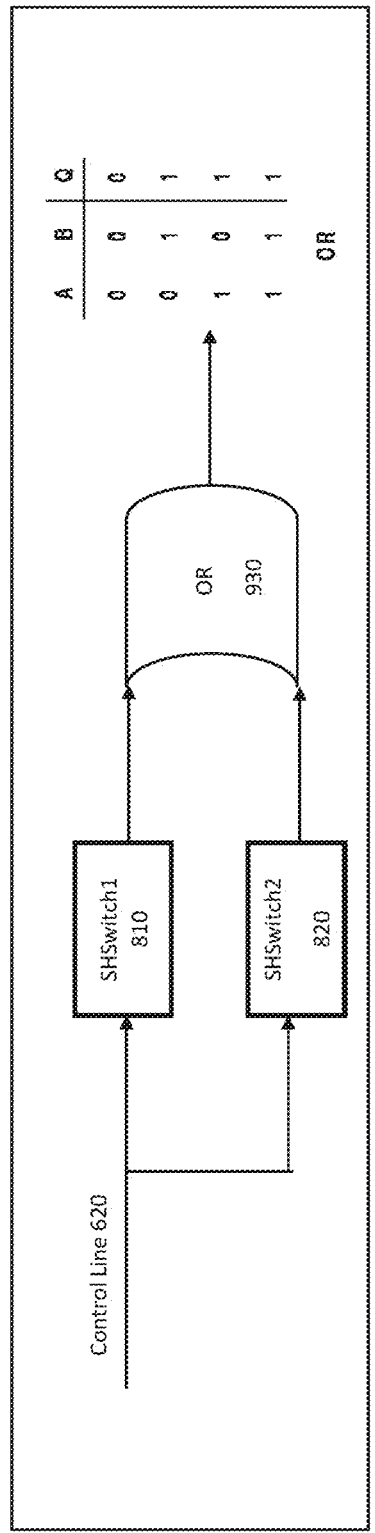

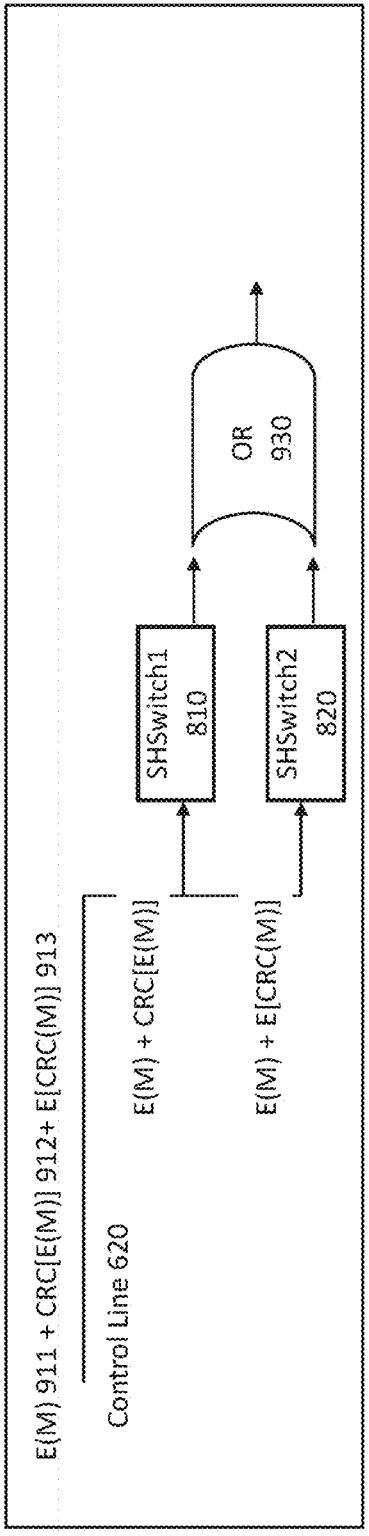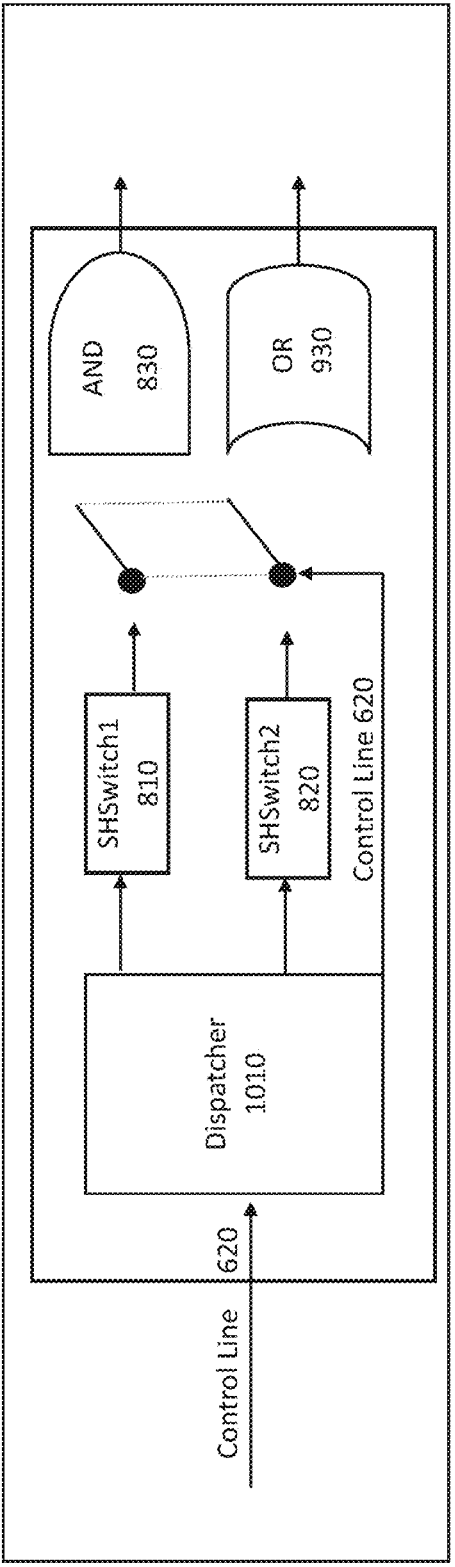

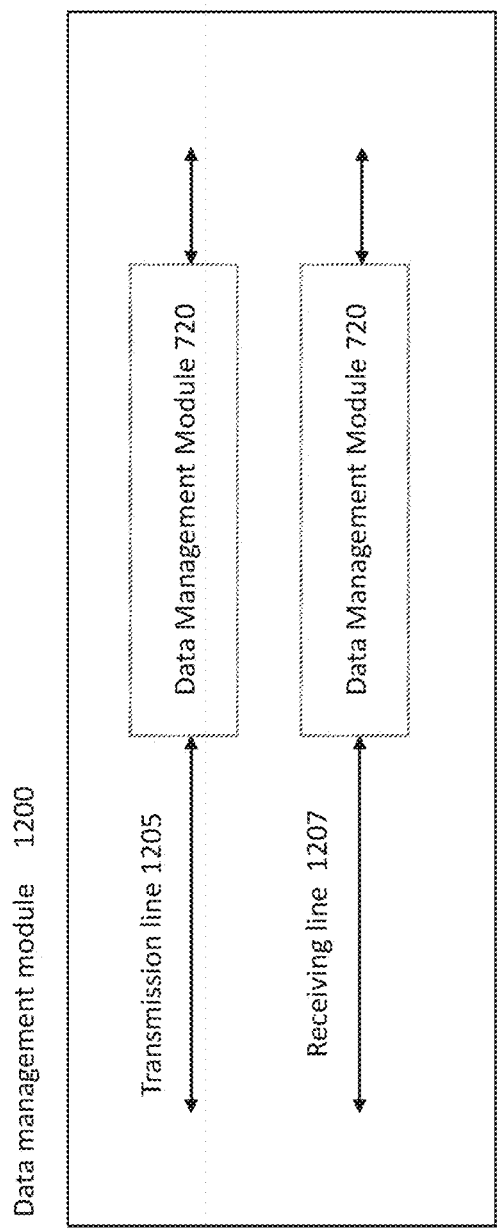
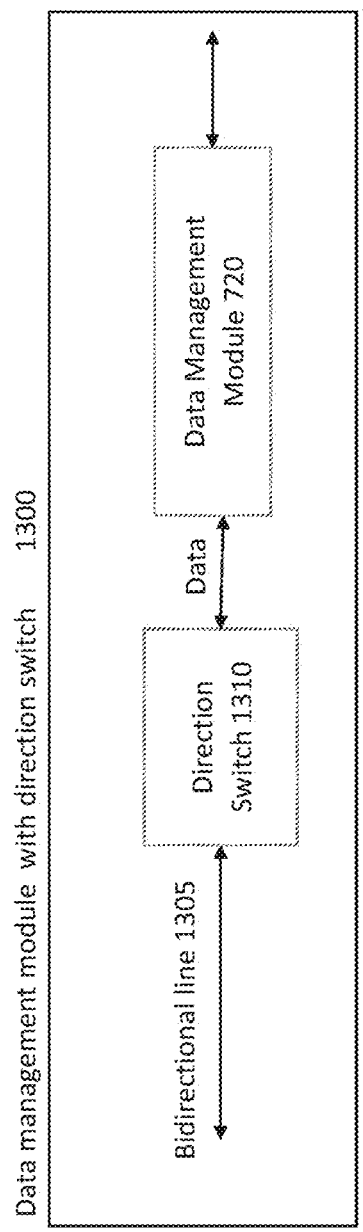
Figure 14
Figure 15

DATA SECURITY SYSTEMS AND METHODS ON CONTROLLED DEVICES

REFERENCES

The Patent Application PCT/IL2017051166 is incorporated by reference

FIELD OF THE INVENTION

The present invention relates to the field of data security in connected devices

BACKGROUND

In the IoT world, devices are usually deployed and organized in networks, and both devices and networks are controlled by some administrative authority, for example service providers who are responsible for device control and maintenance. Service providers can manage the device on different terms, as owners as contractors or as licensees.

Service providers are, to a certain extent, Trusted entities. They may not necessarily perform functions of trust control over the network functionality, but they are the guarantors of the integrity and operability of the nodes themselves.

SUMMARY OF THE INVENTION

A blockchain network architecture of an infrastructure for creating end-to-end security between all public network blockchain nodes includes administrator nodes configured to control corresponding blockchain nodes by reading logs, testing and configuration, wherein the nodes synchronizing between the blockchain nodes; blockchain nodes configured to communicate with each other through open, unsecured channels connected to a public network, and at least one blockchain core embedded in blockchain nodes of electronic smart IoT devices that include a transaction module, module of blockchain specific applications and the secure memory; a dual core switching access control module combined hardware and software components; a controlled switch or connector; and an in-device administrator module for configuration update and route of trust for all module of blockchain nodes. Information is transmitted between the dual core switching access control module through the blockchain nodes to the controlled switch or connector.

According to some embodiments of the present invention the blockchain core can be implemented as an embedded system.

According to some embodiments of the present invention the blockchain core can be implemented as a stand-alone device.

According to some embodiments of the present invention the verification nodes are selected randomly by each blockchain nodes.

According to some embodiments of the present invention the blockchain core embeds a smart contract generation mechanism which automatically creates subject matter related contracts.

According to some embodiments of the present invention the blockchain core can include an additional module including electronic wallet.

According to some embodiments of the present invention the blockchain core can include an additional module including virtual IO manager According to some embodiments of the present invention one of nodes, several nodes or all nodes can include two or more blockchain cores.

According to some embodiments of the present invention each module in the blockchain core is physically separated, then corresponding programs execute in HW separated trust execution environments.

According to some embodiments of the present invention the controlled connector system additionally can contain a control electronic element with processor and memory for data flow management.

According to some embodiments of the present invention the control connector system includes control line and the control management module is used for handling control line by commands.

According to some embodiments of the present invention the controlled switch can handle data line by switching input and output data lines ON/OFF corresponding to commands from control management module.

According to some embodiments of the present invention testing includes a check mechanism by sending special request to a randomly chosen node or set of nodes, wherein in response to this request, nodes from the selected set validate the transaction and recommend adding it to the ledger or rejecting the transaction.

According to some embodiments of the present invention the check mechanism starts automatically and does not require cryptocurrency.

According to some embodiments of the present invention the generation of a transaction and its verification are carried out automatically, wherein each sensor sends information to the certain blockchain node and corresponding node automatically generates transaction from the received information.

According to some embodiments of the present invention the switches are functions in a program code and the state of switches may be set by a user via graphical user interface (GUI) or via physical man machine interface (MMI).

According to some embodiments of the present invention the architecture includes an embedded smart contract generation mechanism which automatically creates subject matter related contracts in response to the user filling corresponding fields in the database.

According to some embodiments of the present invention in case of multi-administrating authorities or multi-users, all commands or access requests are verified according to user or administrating authority permissions.

According to some embodiments of the present invention the secure memory system includes the non-volatile memory (NVM), the controlled memory protection unit (MPU), the controlled switch and the feedback supported control unit.

According to some embodiments of the present invention the control unit manages the at least one of the following: authentication and authorization of administrator, which sends command by control channel; authentication and authorization of user, which sends data by the data channel; configuration of the controlled switch; configuration of the controlled memory protection unit; configuration of the filter; generation and sending feedback to administrator.

BRIEF DESCRIPTION OF THE DRAWINGS

FIG. 6 presents a schematic block diagram of the controlled switch according to one embodiment of the present invention.

FIG. 7 presents a schematic block diagram of the management system in the controlled switch according to one embodiment of the present invention.

FIG. 8 presents a schematic block diagram of the control system with logical AND operation according to one embodiment of the present invention.

FIG. 9 presents a schematic block diagram of the control system with logical OR operation according to one embodiment of the present invention.

FIG. 10 presents a schematic block diagram of the command management in the control system with logical OR operation according to one embodiment of the present invention.

FIG. 11 presents a schematic block diagram of the command management system implementation according to one embodiment of the present invention.

FIG. 14 presents a schematic block diagram of the data management module implementation in the data control system according to one embodiment of the present invention.

FIG. 15 presents a schematic block diagram of the data management module with direction switch implementation according to one embodiment of the present invention.

DETAILED DESCRIPTION OF SOME EMBODIMENTS OF THE INVENTION

In the context of IoT, a smart device is an electronic device with processing capabilities connected to other devices or network. Smart devices that belong to a network which is controlled by some administrative authority are referred to here as Controlled Smart Devices.

Controlled smart devices usually meet the following requirements:
  constant power supply
  constant internet connection
  availability of computation resources
  operational control by trusted authority Examples of Smart Controlled devices are Smart Meters, Routers and Gateways, Small Cellular Antennas, Smart Charging Units etc. When these devices are networked, they form a distributed network of compact computer units. This distributed processing power can be utilized by different applications which require distributed network of computer units, for example CDN (content delivery network), Edge computing, CRM (customer relationships management), Blockchain & NFT (Non-fungible token) and others.

Such applications may serve a purpose or functionality of the network they are deployed on, but they may also serve a purpose or functionality unrelated to their hosting network, i.e. only make use of the availability of resources and control of these networks.

The main challenges when deploying these applications in a distributed network of computer units are security, privacy, data ownership, data authenticity and remote control and management.

Figure 1:
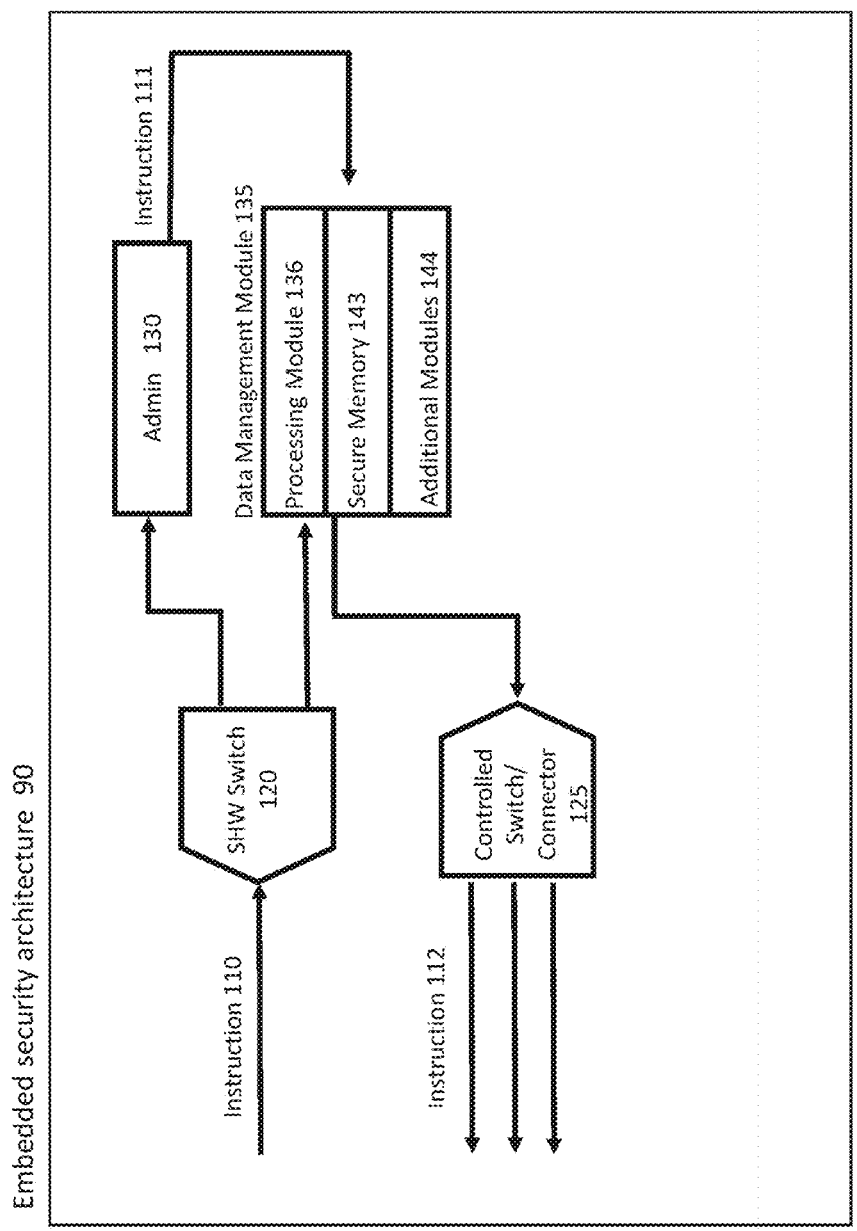
FIG. 1 presents a schematic block of the embedded security architecture according to one embodiment of the present invention.

In the current invention we disclose a data security system and methods which are configured to manage and control smart devices based on the embedded security architecture 90 (FIG. 1). The embedded security architecture 90 includes administrator module 130, data management module 135, switching access control module 120, implemented as software-hardware switch and controlled switch 125.

The data management module 135 includes processing module 136, secure memory 143 and application specific module 144.

According to some embodiments of the present invention the processing module 136 can be implemented as integrated electronic circuit, printed circuit board or as system of different electronic elements. The implementation depends on the tasks of the smart device within the distributed network. For example, in an Edge Computing Network a smart device can perform image processing tasks, in which case the processing module 136 may be implemented ASIC with predefined set of image processing instructions.

The unique architecture according to the present invention enables control and management of individual smart devices in a network and management of distributed processing tasks by them, thus utilizing not only the processing power of each device on its own but also the embedded potential processing power of the network.

The Administrator module 130 performs internal administrative tasks: secured boot, secured update of SW, isolation administration, for example containers administration in the processing module 136, task distribution and control of the execution process.

The embedded security architecture 90 creates trusted controlled execution environments, where various tasks can be performed safely with guaranteed privacy.

Figure 4:
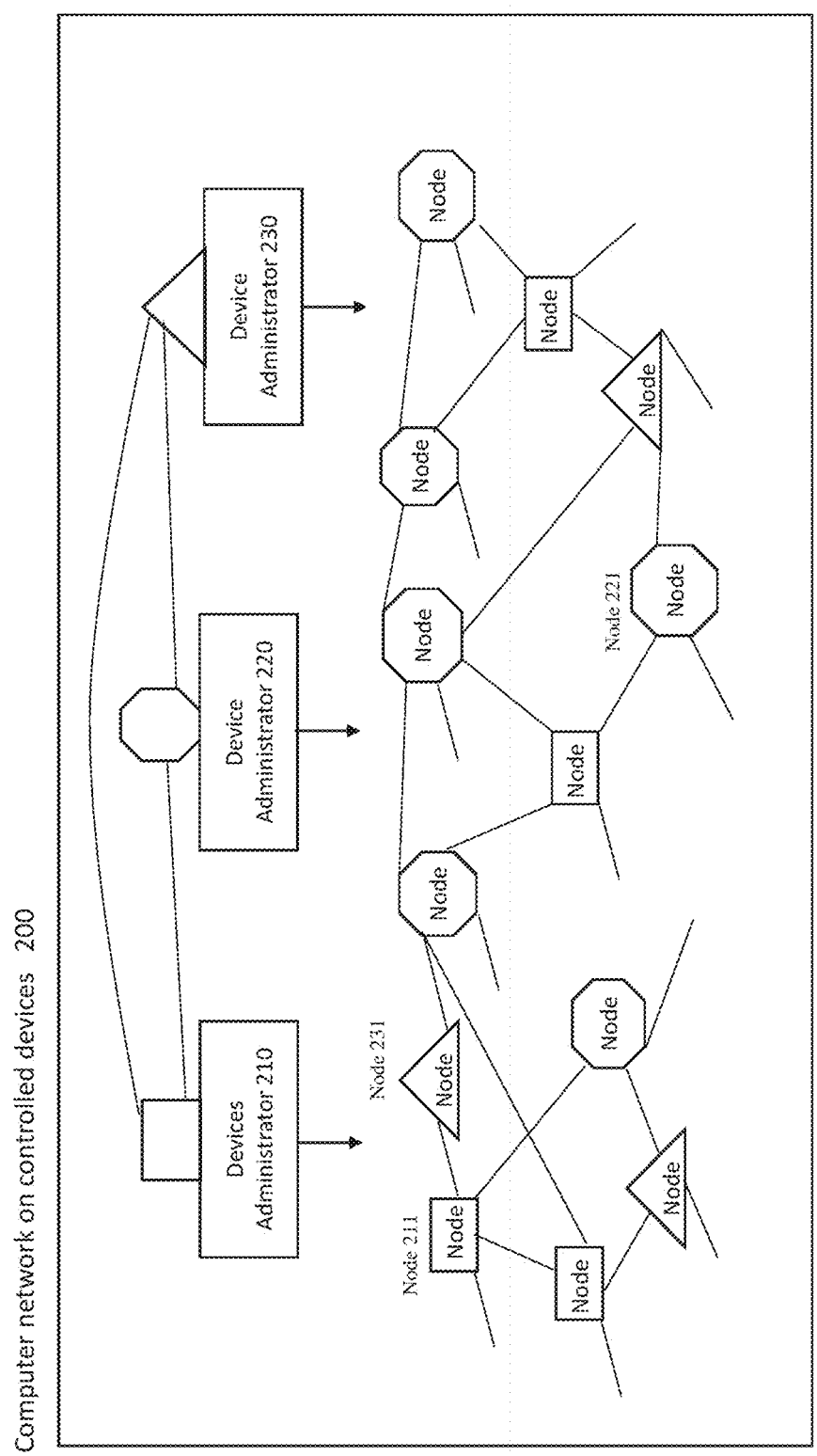
FIG. 4 presents a schematic block diagram of the blockchain network on controlled devices according to one embodiment of the present invention.

Control functions are divided into two levels. The first level is network level. On this level device administrator nodes 210,220,230 (FIG. 4) control computing nodes 211, 221,231 (FIG. 4). Administrator nodes perform specific network management tasks, such as:

Control corresponding computing nodes (read logs, testing, . . . )

Synchronization, for example coordinate time with other certified administrator nodes.

Coordinate PKI with other certified administrator nodes

The second level of control is device level, and is performed by the in-device administrator module 130.

Blockchain (BC) is an example of an application for which the present invention presents significant advantages and enables highly beneficial deployment options otherwise impossible. Blockchain is a list of records that is spread over a network of nodes and is considered to be an unalterable data storage. The attribute of data immutability is achieved by either of the following:

In a Private Blockchain Network—a closed network where all nodes are known to and managed by the network owner/administrator and thus considered safe from tampering or manipulation, and In a Public Blockchain Network—the cost of manipulating the list of records is higher than the potential gain from such manipulation. This is achieved by assigning the participating nodes with costly computational tasks, requiring in return an incentive mechanism to compensate the nodes for performing theses tasks (e.g. cryptocurrency).

To participate in a public blockchain network a node must possess hefty computational resources and consume a lot of energy. Almost all types of IoT devices do not comply with these requirements. Therefore, the implementation of blockchain on IoT devices can only be done in closed private networks. It is currently impossible to implement blockchain on IoT devices in open, public network.

The present invention enables the implementation of open, public blockchain network on IoT devices. The attribute of data immutability is rendered to the device by adding, in addition to standard blockchain resources (computing power, memory, cryptographic primitives and special hardware architecture), control mechanisms for protecting the device itself.

In the present invention a smart controlled device with embedded blockchain architecture is described in details. Embedded blockchain architecture 100 (FIG. 2) includes Admin module 130, blockchain core 140 (or plurality of blockchain cores 140), software-hardware (SHW) switch 120 and controlled switch 125.

Figure 2:
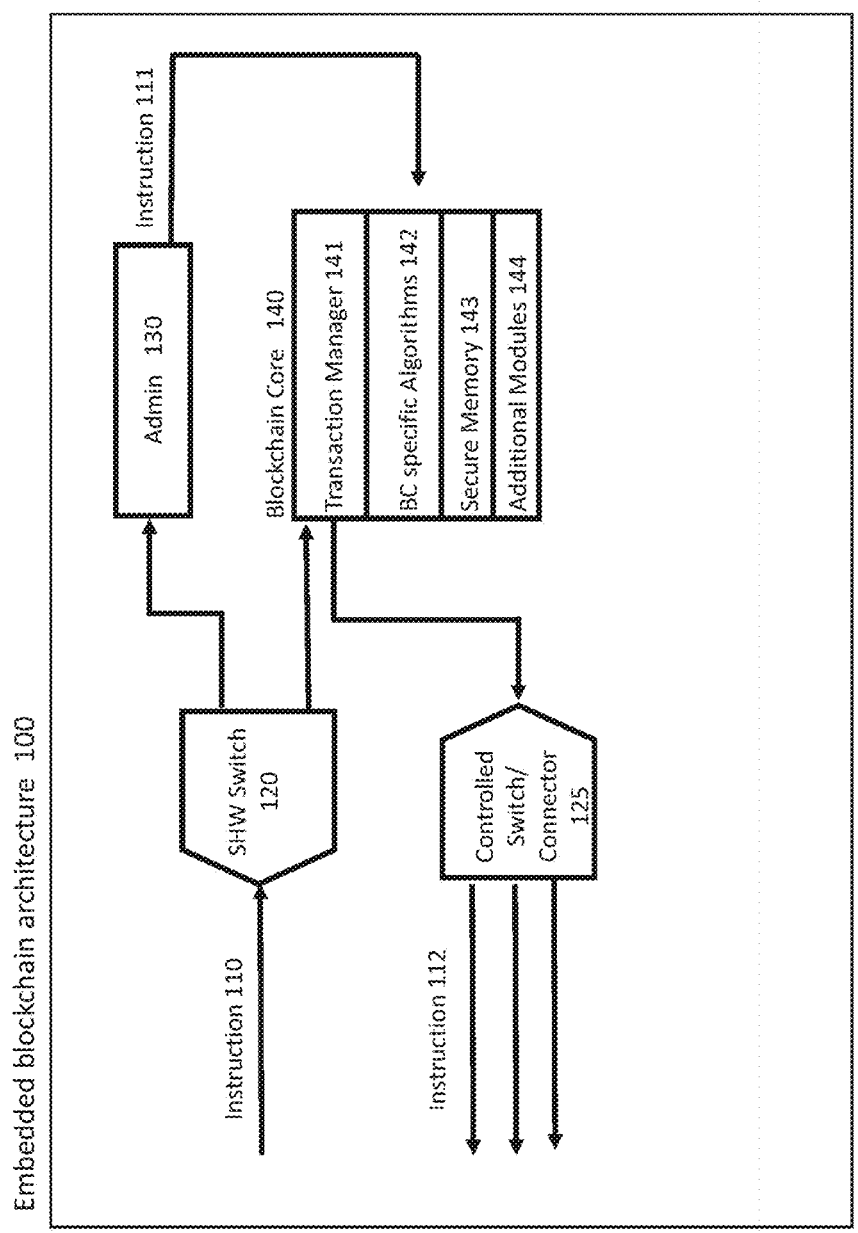
FIG. 2 presents a schematic block diagram of the embedded blockchain architecture according to one embodiment of the present invention.

According to one embodiment of the present invention the blockchain core 140 includes transaction manager 142, library of blockchain specific algorithms 142 and security memory 146 (FIG. 2).

In the case of blockchain, using Smart Devices as nodes of distributed networks, allows adding to standard blockchain resources (computing power, memory, cryptographic primitives and special hardware architecture) external control mechanisms for protecting the device itself.

In the present invention a smart controlled device with embedded blockchain architecture is described in details. Embedded blockchain architecture 100 (FIG. 2) includes Admin module 130, blockchain core 140 (or plurality of blockchain cores 140), software-hardware (SHW) switch 120 and controlled switch 125.

According to one embodiment of the present invention the blockchain core 140 includes transaction manager 142, library of blockchain specific algorithms 142 and security memory 146 (FIG. 2).

Embedded blockchain architecture 100 may be configured as a Trusted Execution Environment (TEE). Smart Devices with the embedded blockchain architecture are the basis for building blockchain networks with some new capabilities. We call such networks—Blockchain on controlled devices.

The blockchain network on controlled devices (FIG. 4) uses two types of nodes. First type is administrator nodes 210/220/230 and second, blockchain nodes 211/221/231. Administrator nodes perform specific management tasks, such as:

Control corresponding blockchain nodes (read logs, testing, . . . )

Synchronization, for example coordinate time with other certified administrator nodes.

Coordinate PKI with other certified administrator nodes.

Detailed Description of Administrator Nodes Tasks:

Administrator nodes are not directly involved in the process of blockchain generation. Administrator's tasks are configured to control the operation of the blockchain network, by providing secure channels for the blockchain nodes management and support PKI. Together all administrators create a network infrastructure for exchanging certificates, exchanging checkup results information of the corresponding nodes and exchanging other service information. This first administrators network infrastructure can be private or public depending on technical capabilities.

Other type of administrator tasks is configuring the blockchain network, for example synchronization of devices' timers (timestamp synchronization). Administrators perform these tasks through a second network infrastructure. The second network infrastructure is formed by the administrator and controlled devices. The second network infrastructure can also be private or public depending on technical requirements. Administrator sends control instructions to blockchain nodes to configure nodes in a secure and trusted manner. Configuration tasks can include secure update of blockchain core modules, nodes verification, nodes audit, failed nodes detection, new nodes integration and other tasks.

The third network comprises Blockchain nodes. Generally, this network should be public, but depending on specific tasks can be private or permissioned.

Each blockchain node comprises blockchain core 140 (FIG. 2).

According to one embodiment of the present invention the blockchain core can be implemented as a stand-alone device.

According to one embodiment of the present invention the blockchain core can be implemented as an embedded system.

Blockchain core 140 comprises variety of modules that perform specific tasks.

According to one embodiment of the present invention the blockchain specific algorithms module 142 can include different algorithms, for example, Transaction generation algorithms, Transaction verification algorithms, Consensus algorithms, Smart Contracts implementation algorithms, Smart Contract management algorithms, Cryptographic algorithms, Wallet management algorithms or Data management algorithms.

According to one embodiment of the present invention the blockchain core can include additional module 144, for example electronic wallet, NFT creation and management module or I/O module for receiving data from external sensors.

According to one embodiment of the present invention the blockchain core may not include any modules, for example the security memory module.

According to one embodiment of the present invention the blockchain node 211, or 221, or 231 can include one blockchain core.

Figure 3:
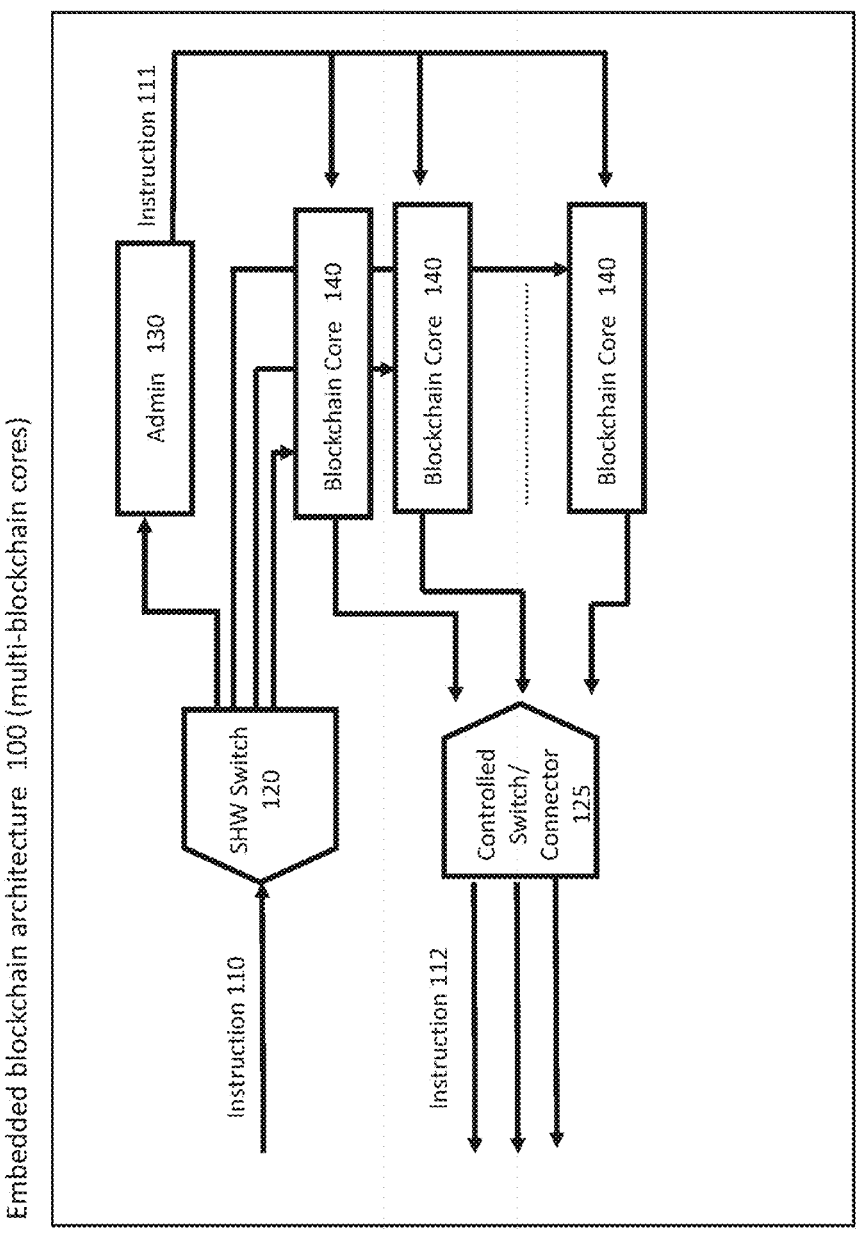
FIG. 3. presents a schematic block diagram of the embedded blockchain architecture with multi-blockchain cores according to one embodiment of the present invention

According to one embodiment of the present invention, one of nodes, several nodes or all nodes can include two or more blockchain cores (FIG. 3). Multiple cores allow setting up intersecting multi-blockchain networks with different protocols and algorithms using the same network.

According to one embodiment of the present invention each module in the blockchain core 140 can be physically separated in distinct hardware modules, hence the corresponding programs running at each module are executed in HW-separated trust execution environments.

According to one embodiment of the present invention each block in the blockchain core 140 can be virtually separated by virtualization technology.

According to some embodiments of the present invention, the blockchain nodes are electronic devices, such as IoT devices, smart devices with the blockchain core 140 inside. Such electronic device may have independent functionality (such as sensors) which is configured to executes a specific task not related to blockchain functionality. The presence of continuously functioning devices, for example, smart meters or smart charging control units, allows the implementation of a new approach, which does not require mining and does not require a compensation mechanism and rewards for block verification/testing/analysis operations.

The present invention allows realization of different consensus protocols and algorithms.

According to one embodiment of the present invention verification nodes (nodes responsible for verification and validation of blocks and transactions) can be selected randomly. In the present invention we call such nodes "Random Duties".

According to one embodiment of the present invention Random Duties carry out their tasks for a certain period of time, after which new ones are selected.

According to one embodiment of the present invention, a "Check Me" mechanism can be used. In this case, a node, having added a new transaction into the blockchain, sends the special request—"Check Me" to a randomly chosen node or set of nodes. In response to this request, nodes from the selected set validate the transaction and recommend adding it to the ledger or rejecting the transaction.

According to one embodiment of the present invention, generation of a transaction and its verification are carried out automatically. For example, distributed ledger in a network of connected cars, can contain information from plurality of sensors. Each sensor sends information to the certain blockchain node and corresponding node automatically generates transaction from the received information. The information from sensors can be of different types like vehicle location, driver ID, time, traffic details etc. Some of the data may be personal and the data management mechanism may be configured in the blockchain network to comply with privacy rules.

According to one embodiment of the present invention the data management mechanism of the transaction and/or communication data is implemented as a filter based on a white/black list.

According to one embodiment of the present invention the white/black list is a statically predefined list formed according to a user defined policy.

According to one embodiment of the present invention the white/black list can be changed dynamically according to a user defined policy related to time stamp, location or other parameters.

According to one embodiment of the present invention the data management mechanism is implemented as a set of switches on data lines. Said switches are controlled by a user and allow closing or opening data transfer on said data lines at any time by user decision.

According to one embodiment of the present invention switches are functions in a program code and the state of switches may be set by a user via graphical user interface (GUI) or via physical man machine interface (MMI), for example by a virtual or physical button According to one embodiment of the present invention switches are physical electronic devices and the state of switches is controlled by a user via GUI or physical MMI, for example by a virtual or physical button.

One of the important tasks in a blockchain network are smart contracts.

The ability to create smart contracts within the blockchain framework is a prerequisite for its performance. The issue of smart contracts is one of the most controversial and open to research. The present invention introduces an embedded smart contract generation mechanism which automatically creates subject matter related contracts based on data generated by the electronic devices of network nodes, such as sensor data.

Most blockchain networks are designed to perform specific tasks. This means that data type and available operations in the blockchain network are predefined.

For example, for managing smart energy network it is sufficient to use the following parameters: energy type, energy byer, energy seller, energy count, energy cost and date.

Such network has predefined set of available operations.

Figure 5:
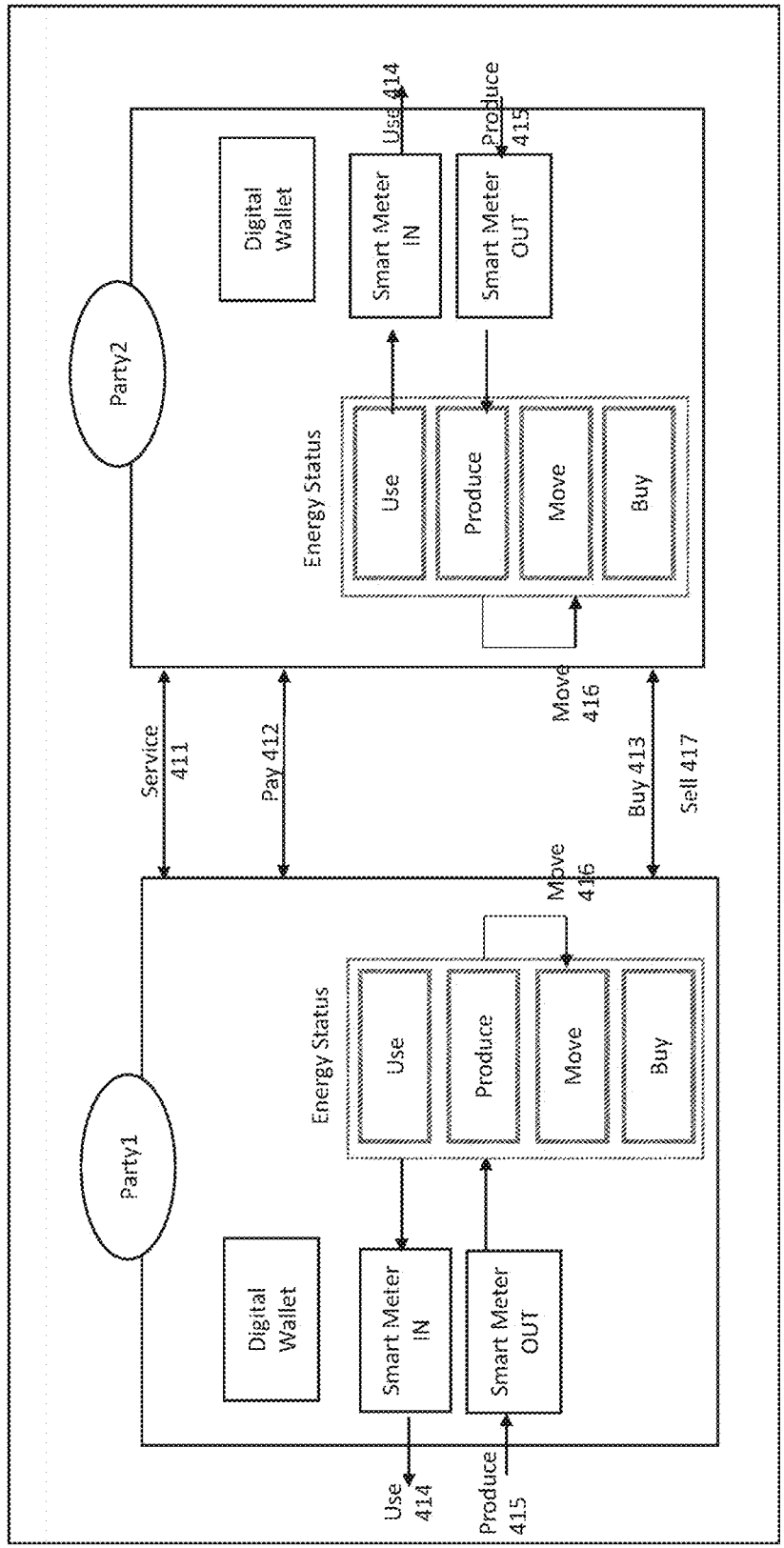
FIG. 5 presents a schematic block diagram of the node architecture in a distributed energy network according to one embodiment of the present invention.

According to one embodiment of the present invention these operations may be: (FIG. 5)

Use 414—Energy consumed for own needs
Produce 415—Produced energy
Move 416—Produced energy consumed for own needs
Sell 417—Transmitted energy
Service 411—Paid services: repair, inspection, audit, etc.
Pay 412—Payment for services or energy
Buy 413—Transmit energy According to one embodiment of the present invention all parameters can be stored in the database in the secure memory 143 and all available operations 411-417 can be implemented as functions of the Smart Contracts implementation algorithms in the library 142 of the BC specific algorithms. Smart contract implementation algorithms can include additional functions, for example data control. In the case of Smart Energy blockchain network data control function can implement Energy distribution equations:

$$b_1+b_2+b_3+b_4=s_1+s_2+s_3+s_4$$

$$s_2^1+s_3^1=b_1 \quad b_i\text{---buy by Party } i$$

$$\Sigma s_2^i=s_2 \; s_3^2=b_2 \; s_i\text{---sell by Party } i$$

$$\Sigma s_3^i=s_3 \; s_3^3=b_4$$

According to one embodiment of the present invention Database and Smart Contracts implementation algorithms can be part of a distributed blockchain network.

Along with the algorithms for implementing the database and smart contracts, algorithms for managing smart contracts should be deployed.

In this case, from the user's side, smart contract will be part of the database. User should fill corresponding fields in the database only.

Here is an example of the smart contract generation for blockchain of distributed energy network by the present invention.

Users: Alice, Bob, Lucas and "Battery" fill corresponding fields in the database and sign the database with an electronic signature Common Condition Table

| User | Payment from | Payment to |
|------|--------------|------------|
| Alice | first day of every month | the fifth of every month |
| Bob | first day of every month | the fifth of every month |
| Lucas | first day of every month | the fifth of every month |

Buy/Sell Table

| To Party | Action | Energy (MW) | From Party | Cost ($/MW) |
|----------|--------|-------------|------------|-------------|
| Alice | Buy | 1 | Bob | 10 |
| Alice | Buy | on demand | Lucas | 15 |
| Bob | Sell | 1 | Alice | 10 |
| Bob | Buy | on demand | Lucas | 15 |
| Lucas | Sell | on demand | Alice | 15 |
| Lucas | Sell | on demand | Bob | 15 |
| Lucas | Sell | available | "Battery" | 5 |
| "Battery" | Buy | available | Lucas | 5 |

Penalty Energy Table

| To Party | From Party | Penalty ($/MW) | Condition |
|----------|------------|----------------|-----------|
| Alice | Bob | 20 | [Buy/Sell].Energy - Real Energy |
| Alice | Lucas | 30 | [Buy/Sell].Energy - Real Energy |
| Bob | Lucas | 30 | [Buy/Sell].Energy - Real Energy |

Penalty Payment Table

| To Party | From Party | Penalty ($/day) | Condition |
|----------|------------|-----------------|-----------|
| Bob | Alice | 20 | [Common Condition].Payment to - Real Payment |
| Lucas | Alice | 30 | [Common Condition].Payment to - Real Payment |
| Lucas | Bob | 30 | [Common Condition].Payment to - Real Payment |

According to one embodiment of the present invention library 142 of the blockchain specific algorithms includes smart contract generation application. Said application converts the database parameters to readable text. For example, User1 (Alice) spends all the generated energy herself. Every month she purchases 1 mW from User2 (Bob) and remaining energy from (User3) Lucas. Bob should transfer 1 mW to Alice and remaining energy he spends himself. Bob, if necessary, purchases energy from Lucas. Lucas provides itself, sells energy to Alice and Bob and the energy remainder transfers to fill the batteries.

Alice buys energy from Bob at a price 10$/1 mW, from Lucas—15$/1 mW. Bob buys from Lucas at price 15$/1 MW. Battery refueling cost—5$/1 mW.

A system of penalties is provided.

If Bob does not give 1 mW to Alice, he pays a $20 fine mW of undelivered energy. Lucas pays to Alice a $30 fine per mW of undelivered energy. Lucas pays to Bob a $30 fine per mW of undelivered energy.

If Alice did not transfer the money on time, then she pays a $20 fine per day, to whom she did not pay. Bob pays the same fine According to one embodiment of the present invention library 142 of the blockchain specific algorithms includes database management application. Said application constantly checks conditions in the database, compares database data with data from smart meters and controls smart contract.

The current invention presents the blockchain infrastructure, on which a blockchain network can be deployed.

The architecture submitted in the present invention is agnostic to any blockchain frameworks.

The present invention describes system and method deploying blockchain network on top of the existing network of smart devices. In this case the issue of network management can be solved by distributing governance tasks between administrators of smart devices.

The embedded blockchain architecture 100 includes embedded security elements such as the SHW switch 120, the controlled switch/connector 125, the TEE (the separated administrator module 130 and blockchain core modules 140). These elements create secure channels not only between all external nodes 211/221/231 but also create internal security channels for all instructions 110-111-112.

The embedded blockchain architecture 100 creates end-to-end security between all parts of the networks. The current invention presents a blockchain infrastructure agnostic to the number of network nodes. Security of the blockchain network does not depend on the number of nodes. All components of a blockchain framework, such as executables, database, API, security keys are protected by-design. No access to user credentials and trading software from any common execution environment exists.

According to one embodiment of the present invention the electronic devices have strong security mechanisms against theft, hacking, and physical tampering as well as built-in remote access channels. The existing security mechanisms are first security level in the present blockchain network.

Detailed Description of Embedded Security Elements:

The SHW switch 120 is dual core module, combined HW & SW components and provides high security and operational flexibility. (Israeli Patent Application No. 267619).

The controlled switch/connector is a specialized system for switching input and output data flow ON or OFF.

The disclosed system has a control line 620 in addition to data line. The control line 620 is used for transmitting special commands for switching states of input connector 651 for internal data line 631 and output connector 652 for external data line 632 to state ON or to state OFF (FIG. 6). For example, the following group of commands can be defined:

{Set Input Channel ON, Set Input Channel OFF, Set Output Channel ON, Set Output Channel OFF}. Control commands are processed by the control commands management module 660, which can include CPU, different types of memory or can be performed based on FPGA/ASIC. The control commands management module 660 handles commands, coming from the control line 620 and after command processing is finished, sends configuration set to the data management module 670 (FIG. 7).

Control commands may have a different format.

According to one embodiment of the present invention the format of the commands can be following:

$$E(M)+CRC[E(M)]+E[CRC(M)]$$

*Encrypted message+CRC from encrypted message+ encrypted CRC from message

According to one embodiment of the present invention commands can be passed through two software-hardware switches (SHW Switch). It allows to perform any operation even when a command is corrupted.

According to one embodiment of the present invention the logical AND operation 830 is used for the output result generation. The logical AND operation 830 ensures that the output is positive when both results from switch 810 and from switch 820 are correct (FIG. 8).

According to one embodiment of the present invention the logical OR operation 930 is used for the output result generation. The logical OR operation 930 allows execute input command when only one result from switch 819 or from switch 820 is correct (FIG. 9).

Here is an example of the OR logical operation (FIG. 10). In this example the command will be executed even if the CRC 912 in command 911+912+913 is corrupted.

Generally, double switches allow checking that a message is correct.

Setting the comparison method is carried out by special commands.

According to one embodiment of the present invention the following commands can be used:
  SET COMPARISON METHOD AND
  SET COMPARISON METHOD OR According to one embodiment of the present invention commands parsing, analysis and further transfer can be carried out by the dispatcher module 1010, which is part of the control command management module 660 (FIG. 11).

Figure 12:
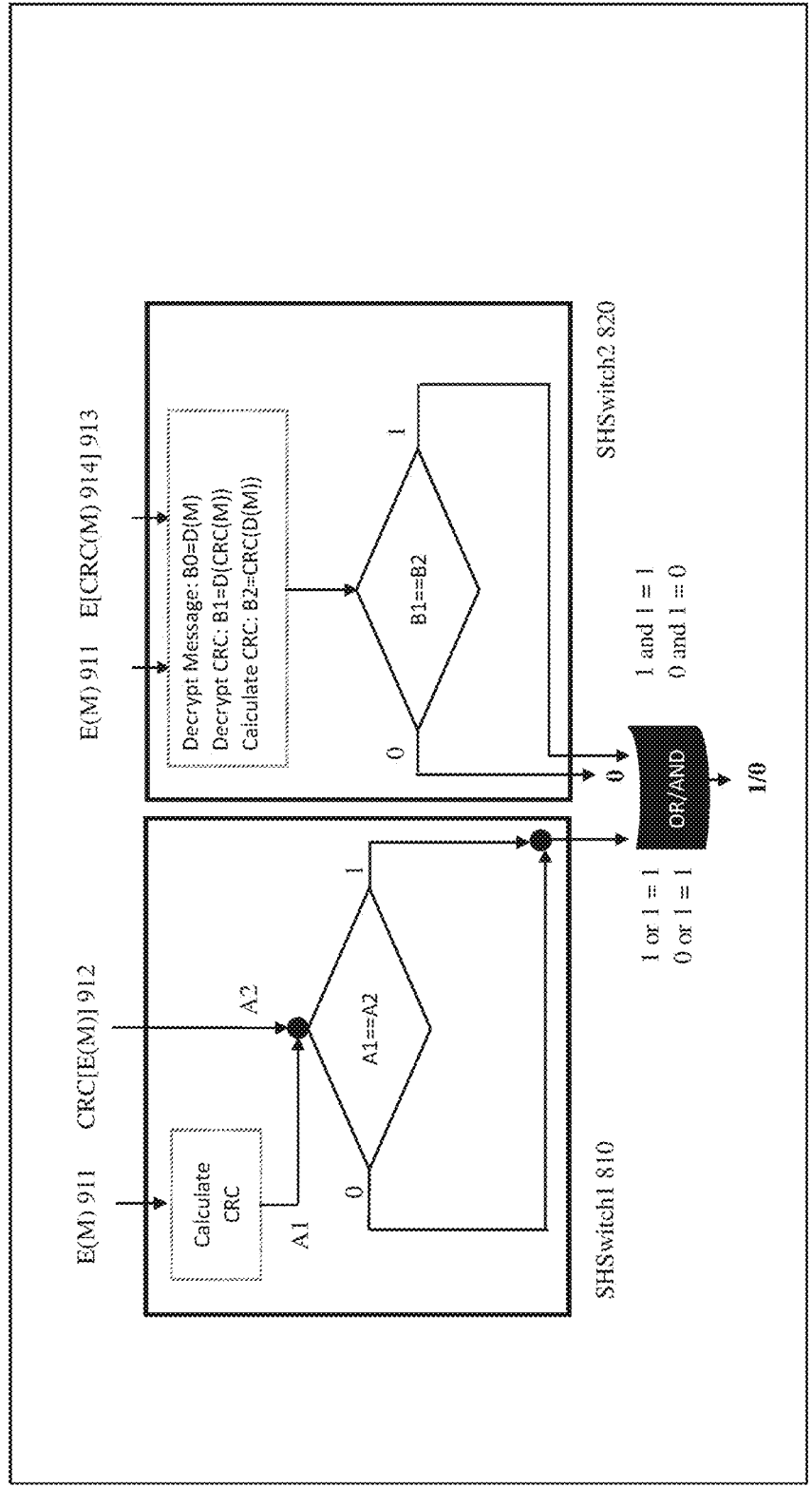
FIG. 12 presents a schematic block diagram of the command management system implementation according to one embodiment of the present invention.

The example of a command parsing and analysis by the dispatcher module is shown on FIG. 12. In this example the CRC 914 from the encrypted part 913 of message 911+912+913 may be corrupted.

Figure 13:
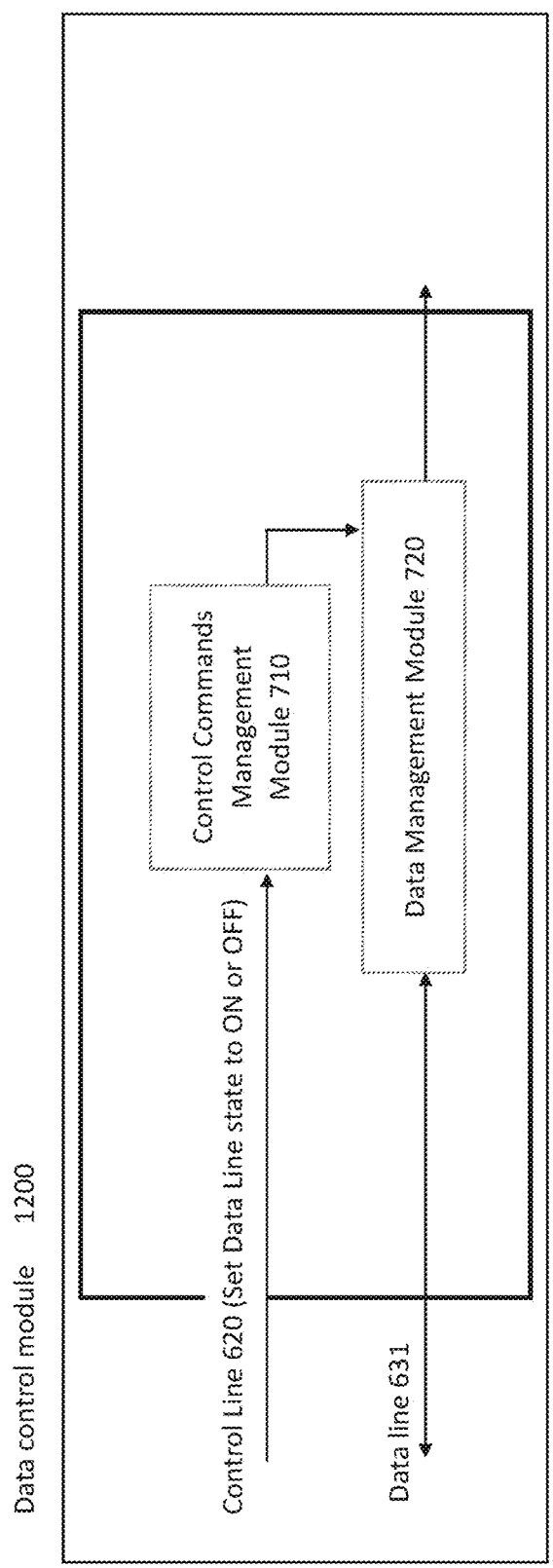
FIG. 13 presents a schematic block diagram of the data control system implementation according to one embodiment of the present invention.

According to one embodiment of the present invention the controlled connector system 1200 additionally can contain a control electronic element with processor and memory—data management module 720. The data management module may be made as an electronic device with CPU and memory, or it may be FPGA/ASIC or any other custom hardware device (FIG. 13).

According to one embodiment of the present invention, in the case when the data line 632 is opened (is in the state ON), the data management module copies data without any processing and sends out. In the case when data Line is closed (is in the state OFF), the data management module may perform different functions depending on connector type (Protocol Type). As shown below, the different function may be at least one of the following: packet filtering procedure, or packet correction procedure, or any other packet management procedure.

According to one embodiment of the present invention, for protocols, which have independent transmit line 1205 and receive line 1207, for example Ethernet protocol, the data management module may be installed on each data line separately. In this case, input and output data flow will be controlled independently (FIG. 14).

According to one embodiment of the present invention, for protocols, which use bidirectional data lines 1305, the data management module may include additional module 1310 for switching between input and output states (FIG. 15).

According to one embodiment of the present invention the data management module handles all packages from the data line and can make decision pass or not pass current packet.

Figure 16:
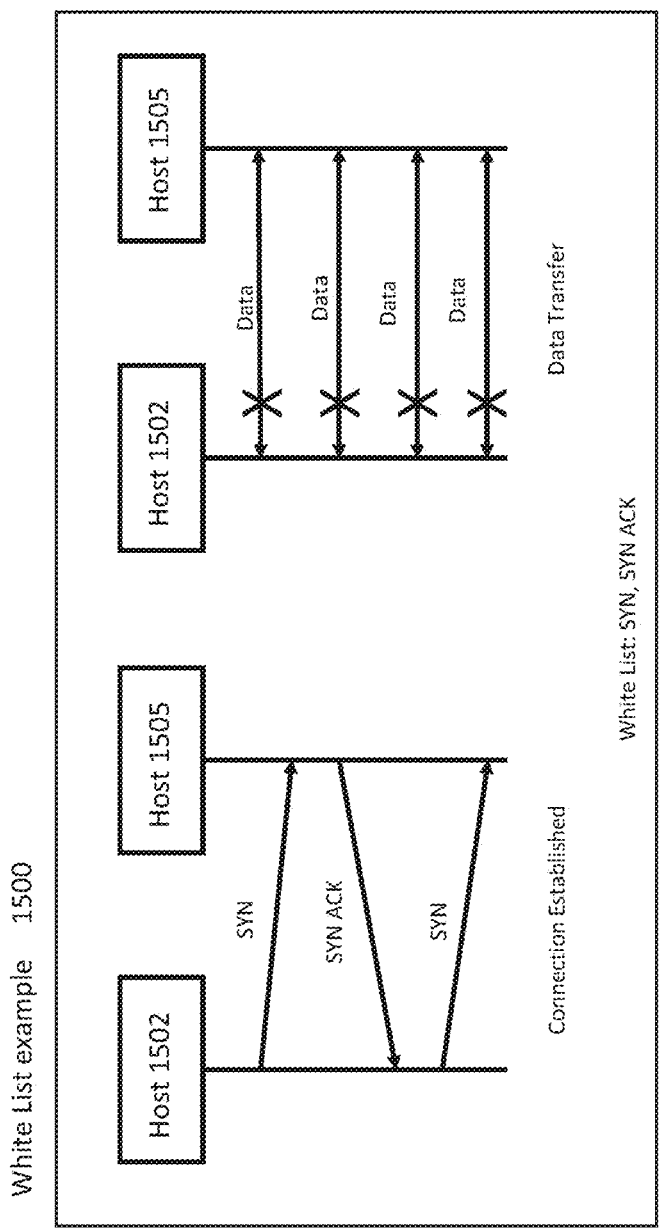
FIG. 16 presents a schematic block diagram of the command management system implementation with white list according to one embodiment of the present invention.

According to one embodiment of the present invention the data management module passes only packets proceed from host 1502 to host 1505 and vice versa from White List 1500 (FIG. 16).

Figure 17:
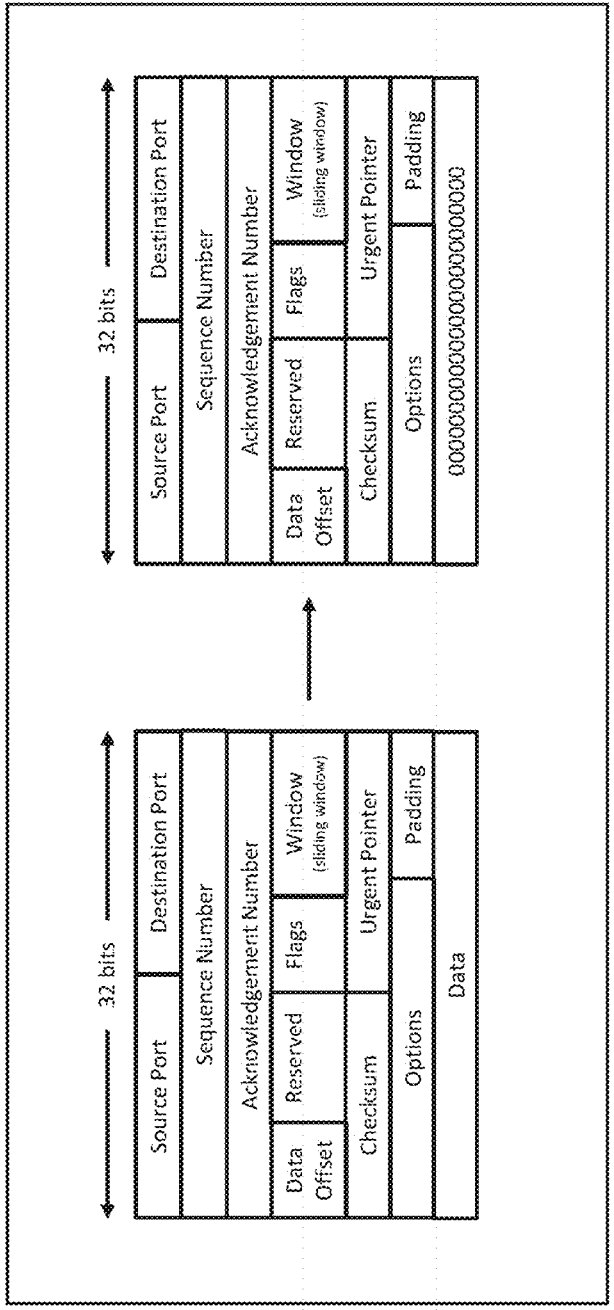
FIG. 17 presents a schematic block diagram of the command management system implementation for TCP/IP protocol according to one embodiment of the present invention.

According to one embodiment of the present invention the data management module sets transmitting Data to zero. (FIG. 17).

Figure 18:
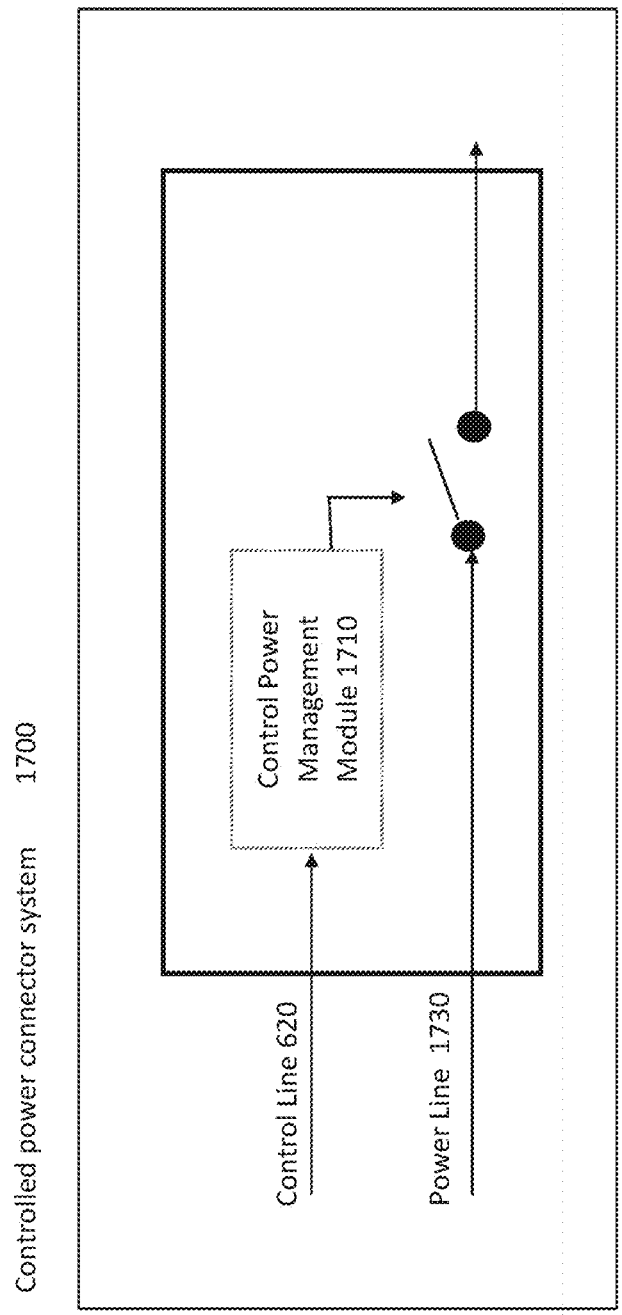
FIG. 18 presents a schematic block diagram of the controlled power connector system according to one embodiment of the present invention.

Instead of a data line 620, the same mechanism can be applied to a power line 1730 in Controlled power connector system 1700 (FIG. 18).

Figure 19:
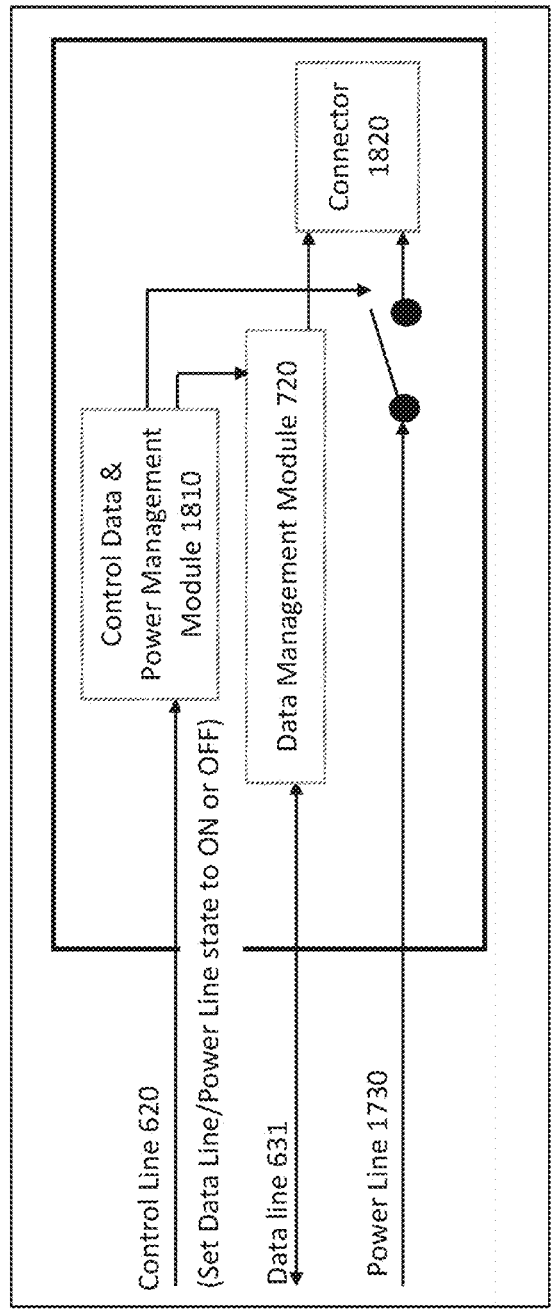
FIG. 19 presents a schematic block diagram of the controlled data/power connector system according to one embodiment of the present invention.

According to one embodiment of the present invention, in the case when data connector includes power line 1730, the control power management module 1710 can be used for handling power line by the following commands (for example):
  Set Power ON
  Set Power OFF According to one embodiment of the present invention the controlled switch can handle both data line 631 and power line 1730 by switching power to connector 1820 ON/OFF (FIG. 19).

Secure Memory Detailed Description:

Known remote memory access control systems operate by a command from administrator/server or operate in accordance with special data included in a request to memory access. Such approaches are suitable in cases where only one administrating authority exists.

In case of multi-administrating authorities and/or multi-users, additional operations are needed. All commands/access requests should be verified according to user/administrating authority permissions.

For example, in the case of blockchain core 140, different software can be managed by different vendors.

By administrating authority, we refer to an entity with permission to read, write, modify and delete its corresponding SW or FW or parts of them.

Figure 20:
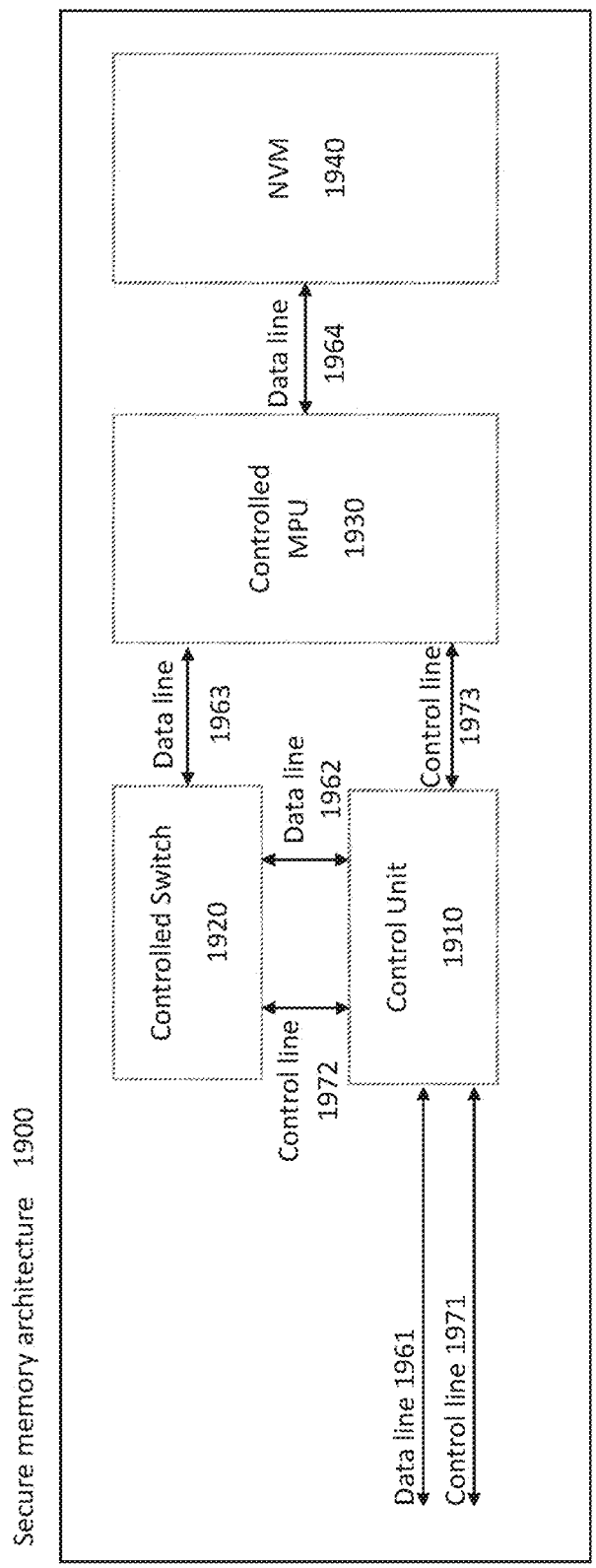
FIG. 20 presents a schematic block diagram of the secure memory architecture according to one embodiment of the present invention.

The common architecture of the secure memory is shown on FIG. 20.

According to one embodiment of the present invention the secure memory system 1900 includes the non-volatile memory (NVM) 1940, the controlled memory protection unit (MPU) 1930, the controlled switch 1920 and the feedback supported control unit 1910.

The non-volatile memory can be a read-only memory, a flash memory, most types of magnetic computer storage devices and so on.

The control unit 1910 manages the MPU memory access control operations and in addition allows change configuration of MPU during system operation. It allows division of the memory map into different number of regions with different privilege permissions and different access rules according with current user resolution. The configuration can be downloaded by the control unit through the control line 1973 at any time.

The controlled switch can open/close data path for read only, write only or for both read and write operations.

According to one embodiment of the present invention the controlled switch operates by external commands from the control unit. Commands are sent to control switch over the command line 1972.

According to one embodiment of the present invention the controlled switch can operate by processing of input data. In this case data should include special information for decision algorithm.

According to one embodiment of the present invention the control unit is electronic component which includes processor and memory.

According to one embodiment of the present invention the control unit can includes SHW Switch.

According to one embodiment of the present invention the control unit manages the following issues:
  Authentication and authorization of the administrator, which sends command by control channel 1971
  Authentication and authorization of the user, which sends data by the data channel 1961
  Configuration of the controlled switch 1920
  Configuration of the controlled memory protection unit 1930
  Generation and sending feedback to the administrator According to one embodiment of the present invention the secure memory system 1900 includes all described components (FIG. 20).

Figure 21:
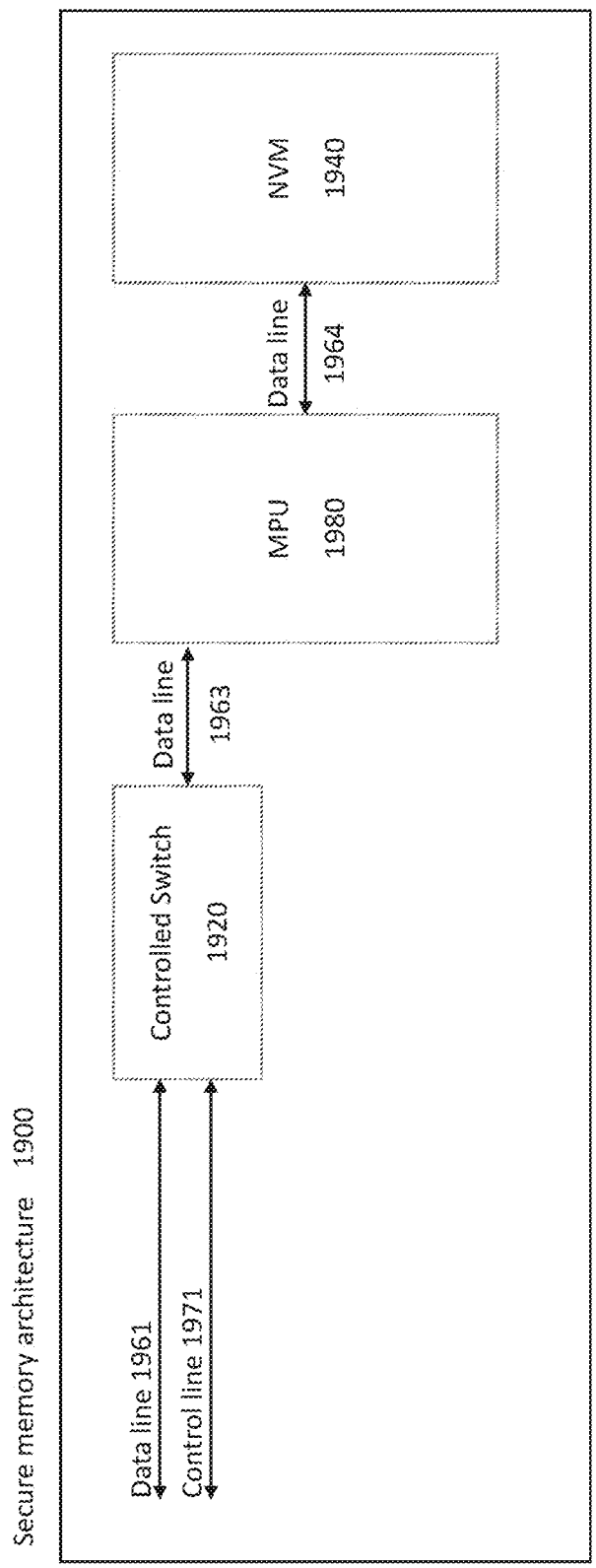
FIG. 21 presents a schematic block diagram of the secure memory architecture without the control unit according to one embodiment of the present invention.

According to one embodiment of the present invention the secure memory system 1900 can include the controlled switch 1920, the MPU with predefined configuration 1980 and the NVM 1940 (FIG. 21).

Figure 22:
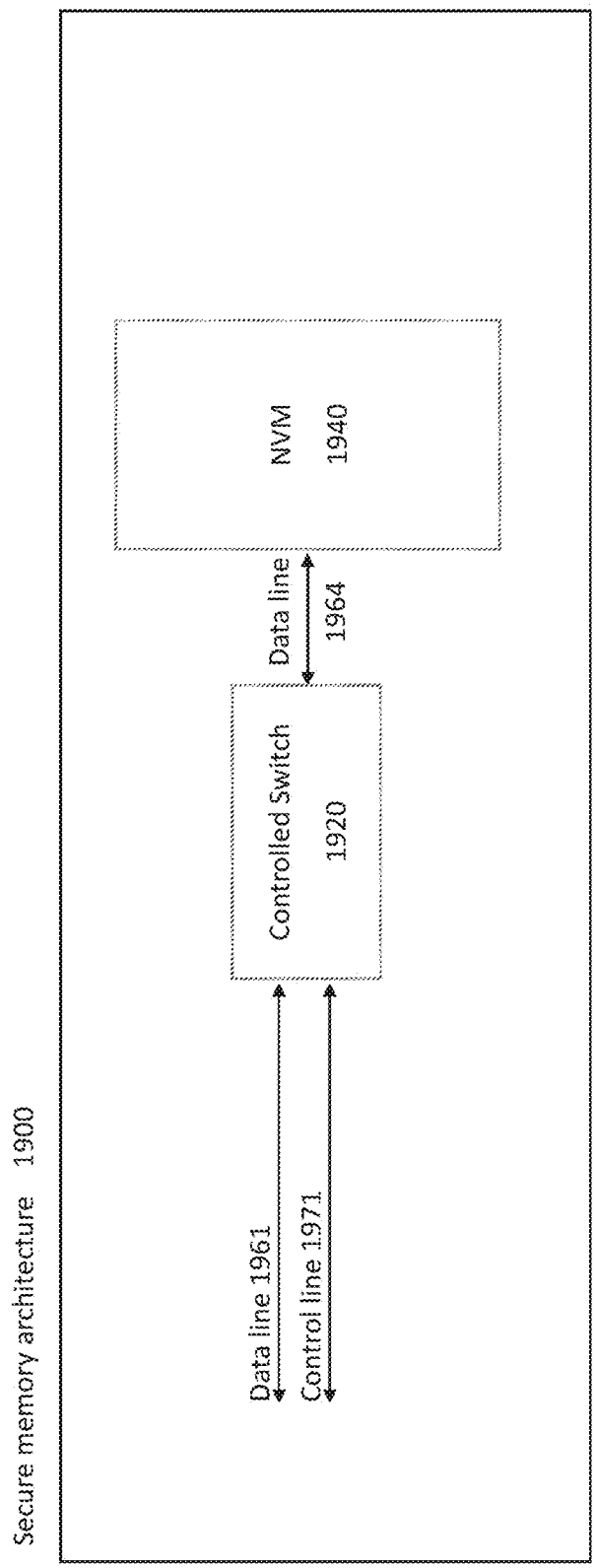
FIG. 22 presents a schematic block diagram of the secure memory architecture according to one embodiment of the present invention.

According to one embodiment of the present invention the security memory system 1900 can include only the controlled switch 1920 and NVM 1940 (FIG. 22).

According to some embodiments the security memory system 1900 can include input from, and/or control additional components and realize different scenarios of memory management.

According to one embodiment of the present invention the secure memory system can open/close data path according to a user's permission. In this scenario secure memory system serves as an authorized switch.

According to one embodiment of the present invention the secure memory system can open/close data path according to external commands. In this scenario secure memory system serves as a gatekeeper.

According to one embodiment of the present invention, the update firmware process of specific electronic component by authorized administrator only has the following steps:
  Administrator sends command "Update Firmware" and includes a new firmware and personal information required for authentication process. In one embodiment the command is sent over command line 1971 and the new firmware code is sent over data line 1961. In other embodiment both the command and the firmware code are sent over data line 1961 (FIG. 20)
  Control unit 1910 checks personal information and writes corresponding configuration to the MPU 1930 over command line 1973
  Control unit calculates HASH1 of the new firmware and sends feedback to administrator.
  Administrator compares HASH1 with the original HASH and sends command "Start Update" or "Don't Update" according with comparison result.
  Control Unit opens Switch 1920 for Write Operation and sends the new firmware to NVM over data lines 1962/1963/1964
  Control Unit opens Switch for Read operation and reads the new firmware and calculates HASH2.
  Control Unit compares HASH1 and HASH2 and sends command RESET or DELETE according with comparison result.

According to one embodiment of the present invention the control unit should communicate with different administrators and different users through different protocols.

Figure 23:
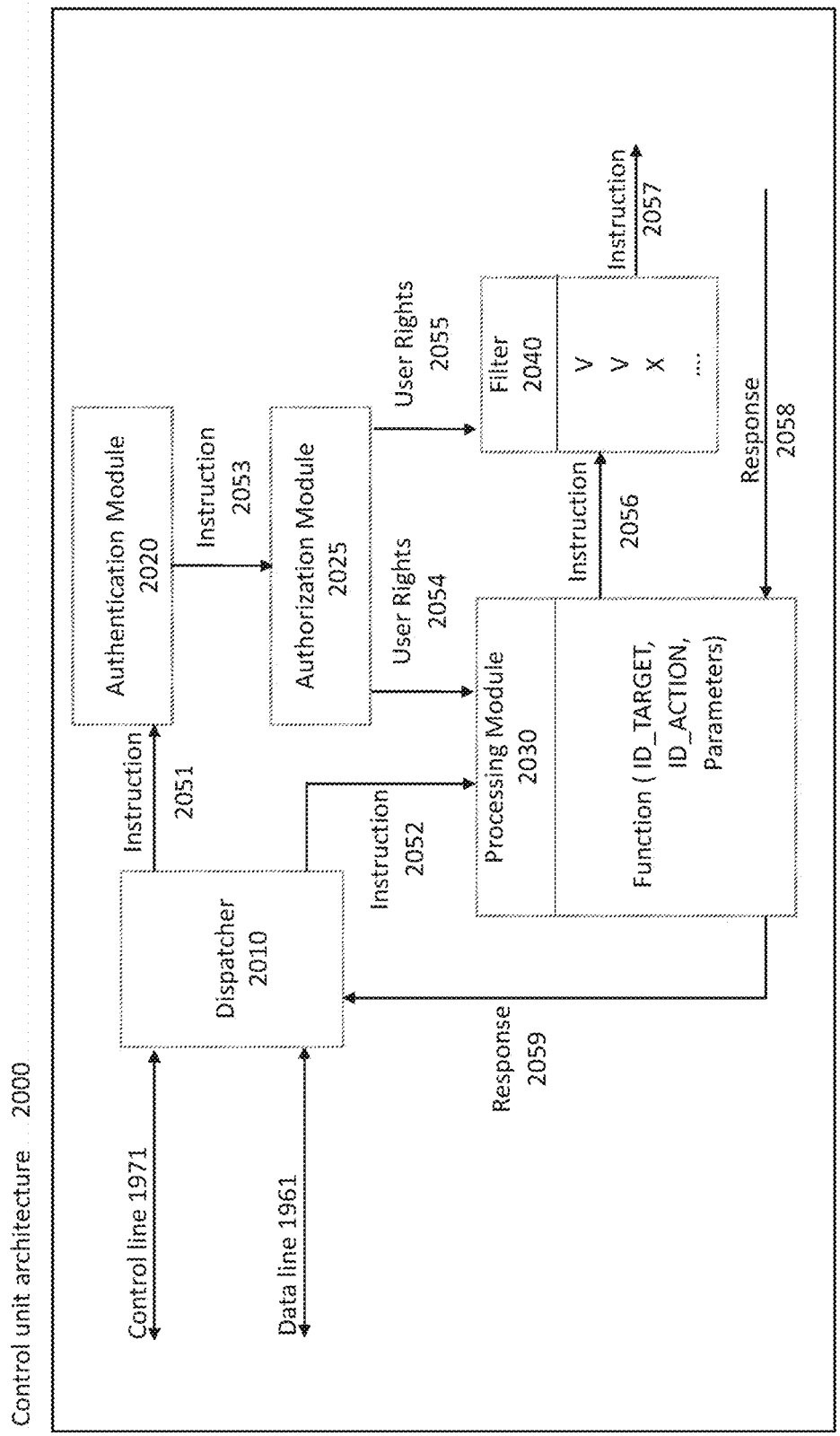
FIG. 23 presents a schematic block diagram of the control node architecture according to one embodiment of the present invention.

For this purpose, the control unit contains special conversion architecture 2000 (FIG. 23).

The dispatcher 2010 receives instruction from an external administrator/user. The instruction includes commands, which are passed over the control line 1971 and data, which is passed over the data line 1961. The instruction is sent in predefined open format. The dispatcher 2010 parses instruction into two parts. The first part, instruction 2051, includes ID information. The second part, instruction 2052 includes technical information (message body). The instruction 2051 transfers data to the authentication module 2020. The authentication module checks user validity and send instruction 2053 to the authorization module 2025. The authorization module downloads corresponding user rights 2054 into the processing module 2030 and corresponding user rights 2055 into the filter 2040. The processing module requests data from the dispatcher and in return receives the instruction 2052. The processing module converts message into an internal format with consideration of user rights and sends instruction 2056 to the filter 2040. The filter verifies instruction and sends corrected instruction 2057 to a target. The target returns Response 2058. The processing module transfers response into the predefined open format and returns response 2059 to the administrator/user.

According to one embodiment of the present invention the processing module 2030 and the filter 2040 are implemented as a software processing modules.

According to one embodiment of the present invention the filter 2040 is implemented as an application-specific hardware.

What is claimed is:
1. Infrastructure architecture for deploying a public blockchain on top of a network of controlled smart devices, said architecture comprising:
  blockchain nodes, embedded into smart devices, wherein:
    said smart devices are configured to communicate with each other through open, unsecured channels;
    said smart devices are managed through an embedded security architecture, wherein the said security architecture comprises:
      a dual-core access control switching module having combined hardware and software components to create internal secure and switched path for all instructions between all modules of the security architecture, embedded into smart devices;
      at least one blockchain core, wherein the blockchain core comprises a transaction module, module of blockchain specific applications and the secure memory, wherein the secure memory is configured to validate requests according to the administrator permission of the specified request and ensure secure access to data in a multi-user environment;
      a controlled switching module to create external security channels for all connected smart devices, wherein the switching module is a specialized system for creating read/write or read-only path by switching input and output data flow ON or OFF corresponding to external commands; and an administrator module for configuring, updating and creating a route of trust for both the general smart device software and the blockchain-specific blockchain core;

wherein information is transmitted between the dual core switching-access control module through the blockchain core to the controlled data switching module via the corresponding switched data transmission channels;

administrator nodes configured to control corresponding blockchain nodes by reading logs, testing, configuration and updating;

sync with other certified administrator nodes; and

PKI management with other certified administrator nodes;

wherein the administrator nodes are not directly involved in the process of blockchain generation;

wherein the administrator nodes participate in two independent and separated networks, wherein a first, private network consists only of administrator nodes, for sync with other certified administrator nodes, and a second private network consists of administrator nodes and smart devices, for controlling corresponding blockchain nodes and PKI management, wherein the deployed blockchain network is public;

a ledger for storing verified transactions.

2. The architecture of claim 1, wherein one of blockchain nodes, several blockchain nodes, or all blockchain nodes include two or more blockchain cores for deploying a different public blockchains on top of a network of controlled smart devices.

3. The architecture of claim 2, wherein different blockchain cores allow setting up intersecting multi-blockchain networks with different protocols and algorithms using the same communication network.

4. The architecture of claim 1, wherein one of blockchain nodes, several blockchain nodes, or all blockchain nodes include verification core to validate a transaction and recommend adding it to the ledger or rejecting the transaction.

5. The architecture of claim 4, wherein the blockchain node, at the moment of transaction generation, sends a "check me" message to a set of liable validators, randomly selected by administrator nodes and active only during a certain period of time.

6. The architecture of claim 4, wherein the verification process does not require any incentive mechanisms.

7. The architecture of claim 1, wherein the blockchain core embeds a smart contract generation mechanism which automatically creates subject matter related contracts.

8. The architecture of claim 1, wherein the blockchain core comprises an additional module including at least one of electronic wallet.

9. The architecture of claim 1, wherein each module in the blockchain core is physically separated, then corresponding programs execute in hardware-separated trust execution environments.

10. The architecture of claim 1, wherein a blockchain node receives commands to generate a transaction from the smart device in which it is implemented.

11. The architecture of claim 1, wherein a blockchain node receives commands to generate a transaction from external device.

12. The architecture of claim 1, where the controlled data switching module additionally contains a control electronic element with processor and memory for data flow management, in accordance with a policy implemented as a filter based on a white/black list.

13. The architecture of claim 1, wherein the controlled data switching module includes a control line and the control management module is used for handling the control line by remote commands, in accordance with a policy implemented as a filter based on a white/black list.

14. The architecture of claim 1, where in the secure memory contains a controlled data switching module for managing data transmission channels, in accordance with a policy implemented as a filter based on a white/black list.

* * * * *